(12) United States Patent
Poulbot et al.

(10) Patent No.: US 6,991,013 B2
(45) Date of Patent: Jan. 31, 2006

(54) TIRE WITH A RECEIVING ANTENNA

(75) Inventors: Valery Poulbot, Les Martres d'Artiere (FR); Antoine Robinet, Grenoble (FR); Thierry Thomas, Varces-Allieres et Risset (FR)

(73) Assignee: Michelin Recherche et Technique S.A., (CH)

( * ) Notice: Subject to any disclaimer, the term of this patent is extended or adjusted under 35 U.S.C. 154(b) by 328 days.

(21) Appl. No.: 10/404,844

(22) Filed: Apr. 1, 2003

(65) Prior Publication Data
US 2003/0217797 A1 Nov. 27, 2003

(30) Foreign Application Priority Data
Apr. 2, 2002 (FR) .................................. 02 04064

(51) Int. Cl.
*B60C 23/00* (2006.01)
*B60C 19/00* (2006.01)
*B29D 30/00* (2006.01)

(52) U.S. Cl. ................. 152/152.1; 156/110.1; 156/123

(58) Field of Classification Search ............ 152/152.1; 156/110.1, 123
See application file for complete search history.

(56) References Cited

U.S. PATENT DOCUMENTS

| | | | |
|---|---|---|---|
| 4,973,958 A | 11/1990 | Hirano et al. | |
| 5,428,363 A | 6/1995 | D'Hont | |
| 5,825,291 A | 10/1998 | Platt et al. | |
| 6,025,807 A | 2/2000 | Jon et al. | |
| 6,195,009 B1 | 2/2001 | Irizarry et al. | |
| 6,630,910 B2 | 10/2003 | Forster et al. | |
| 2002/0041258 A1 | 4/2002 | Schneider et al. | |
| 2002/0044096 A1 | 4/2002 | Chung | |
| 2003/0090424 A1 | 5/2003 | Brune et al. | |
| 2003/0090434 A1 | 5/2003 | Masudaya | |
| 2003/0184493 A1 * | 10/2003 | Robinet et al. | ............. 343/867 |

FOREIGN PATENT DOCUMENTS

| | | |
|---|---|---|
| DE | 468513 | 11/1928 |
| EP | 0 918 308 | 10/2000 |
| FR | 2 771 965 | 11/1999 |
| WO | WO 99/29522 | 6/1999 |
| WO | WO 99/29525 | 6/1999 |

OTHER PUBLICATIONS

English Abstract of French application 2 771 965.

* cited by examiner

*Primary Examiner*—Adrienne C. Johnstone
(74) *Attorney, Agent, or Firm*—E. Martin Remick; Adam Arnold

(57) ABSTRACT

A tire equipped with at least one receiving antenna (2) of a reception device (1) which includes an electronic device (10) intended to be remote controlled by electromagnetic coupling with at least one transmitting antenna (8). This receiving antenna (2) is intended to be connected to the electronic device (10) and is divided into several loop parts (2.1, 2.2) arranged in a parallel circuit, these loop parts (2.1, 2.2) each having a surface (s1, s2), these surfaces (s1, s2) being juxtaposed so that during rolling of the tire the loop parts (2.1, 2.2) are coupled successively and continuously to the transmitting antenna (8).

38 Claims, 12 Drawing Sheets

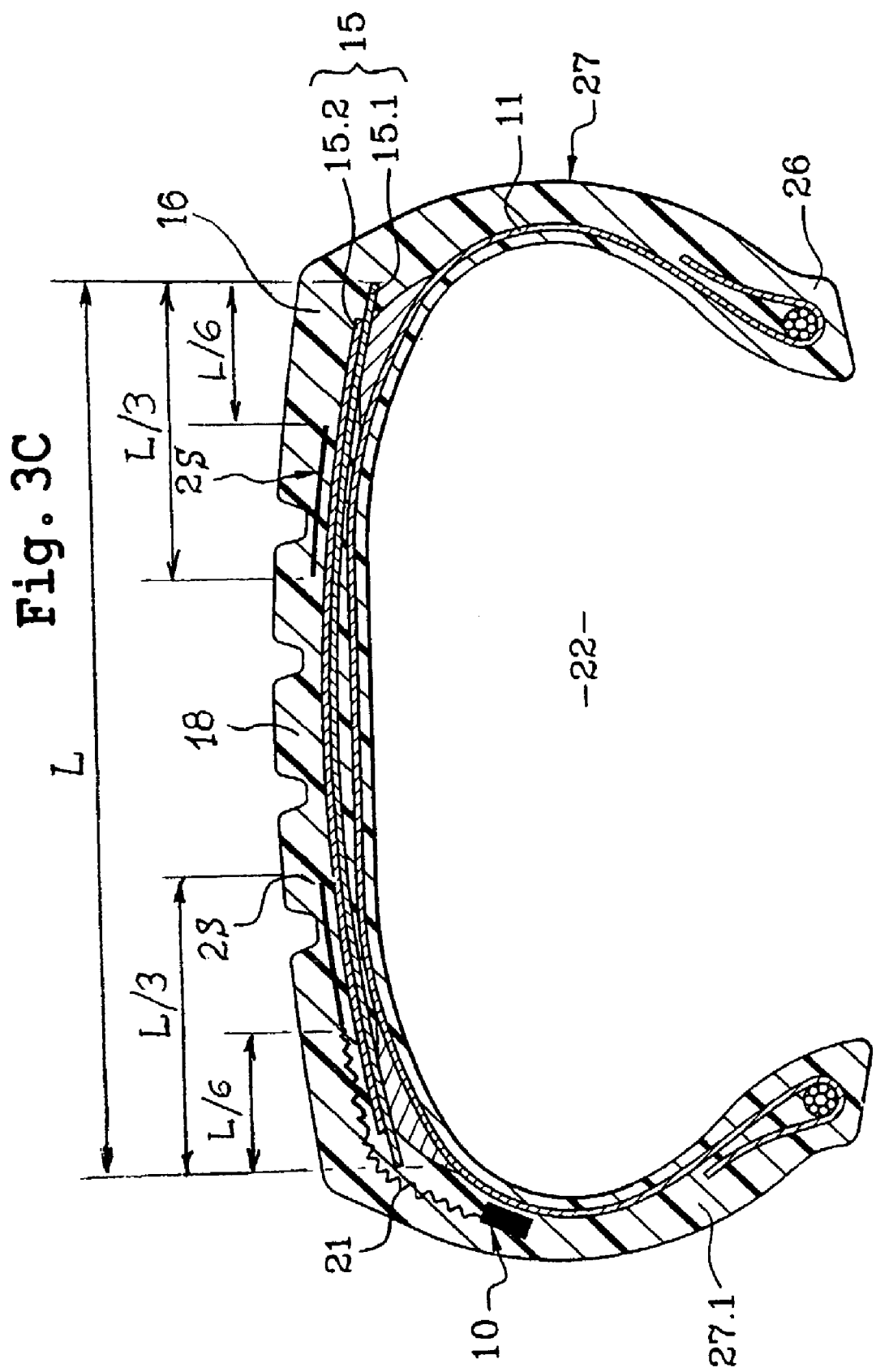

PRIOR ART

TIRE WITH A RECEIVING ANTENNA

TECHNICAL FIELD

The present invention relates to a tire provided with at least one receiving antenna for a receiving device including at least one electronic device remote controlled from a transmitting device external to the tire. The receiving device and the transmitting device communicate without contact via the reception antenna, which is particularly advantageous since when a tire rolls, they move relative to each other.

BACKGROUND AND SUMMARY

The transmitting device is intended to transmit energy and/or information to the electronic device, which may be a sensor, a counter or a device fulfilling another function. The sensor may, in particular, be a force sensor, a temperature sensor or a pressure sensor. The electronic device is intended, as applicable, to communicate data, for example signals relating to measurements, counting or the like, to the transmitting device.

The electronic device is therefore connected to at least a first so-called receiving inductive antenna which must be coupled electromagnetically with at least a second so-called transmitting inductive antenna of the transmitting device. This transmitting device will supply energy to the electronic device and/or control its operation and, where applicable, retrieve the data which it supplies to it. The two antennae are each formed from a conductor in a loop arranged in one or more turns. The two antennae will communicate all around a working frequency $v$. The principle is to generate, from the transmitting device, an electromagnetic field at the working frequency $v$ by means of which energy and/or information will be transmitted.

The energy is transmitted by the carrier wave and is a function of the amplitude of the latter.

The transmitting device comprises, in addition to the transmitting antenna, electronic means for generating the working frequency $v$ and a modulation stage in order to be able to transmit the information in electromagnetic form all around the working frequency to the electronic device. The information is transmitted by the modulation of this same carrier, which may be amplitude, frequency or phase modulation.

The transmitting device can also comprise means for processing the data received from the device.

The receiving device for its part comprises, cooperating with the electronic device, an electronic circuit, this circuit being able to be a rectifying circuit.

French Patent publication FR-A1-2 771 965 describes a tire provided with a receiving antenna connected to a sensor. The antenna and sensor are located in the tire. The antenna is intended to be coupled electromagnetically with another antenna situated outside the tire. The rectangular-shaped receiving antenna, when it is put flat, extends along the periphery of the tire under its tread between a sealing layer (also referred to as the inner liner), situated on the same side as the internal face of the tire, and the radial carcass reinforcement.

The working frequency $v$ is an important parameter since it determines the characteristics of the receiving antenna of the receiving device and those of the transmitting antenna of the transmitting device. The receiving antenna has a resonant frequency which is a function of its intrinsic characteristics, that is to say the resistance of its conductor, the length of its conductor, the value of the intrinsic capacitance distributed along its conductor, its surface area and external characteristics related to its environment such as the magnitude of the stray capacitances and the propensity of the environment to channel the magnetic field lines.

In order to function optimally the receiving antenna of the receiving device must be tuned to the working frequency $v$. The tuning is carried out normally by means of a tuning capacitor connected in parallel with the antenna. On tuning, the following equation is satisfied:

$LC(2\pi v)^2 = 1$ with $L$ the inductance of the receiving antenna, $C$ the total capacitance of the receiving antenna. These quantities $L$ and $C$ are quantities equivalent to the working frequency seen by the receiving device. For example, $C$ will be the sum of all the capacitances involved at the receiving antenna: the intrinsic capacitance of the antenna, the stray capacitance and the capacitance of the tuning capacitor.

Among working frequencies permitted by the AFNOR standards and which correspond to the ISM bands, a working frequency of around ten megahertz is chosen, since with a higher frequency it would be difficult to transmit energy and with a lower frequency the information flow rate would be too low. Having regard to this working frequency, the low power levels involved during the transmission with the transmitting device, the ambient noise and the small size imposed on the transmitting device, which is situated on the vehicle on which the tire is mounted, the surface area of the receiving antenna of the receiving device is large compared with that of the transmitting antenna of the transmitting device.

This results in a resonant frequency that is lower than the working frequency $v$, a high inductance and a high intrinsic capacitance distributed along the conductor and seen by the electronic device. In the tire, high stray capacitances may exist close to the antenna. These are due to the elastomers with a carbon black or silica filler, which are the main constituents of the tire, and to the structure of the tire comprising metallic reinforcements on a crown, and in certain cases a carcass reinforcement which is also metallic.

A long narrow antenna shape also results in a reduction in the resonant frequency.

If the resonant frequency of the receiving antenna is too low vis-à-vis the working frequency $v$, it is not possible to tune the receiving antenna of the receiving device to the working frequency $v$ since the value of its intrinsic capacitance is already too high to achieve tuning. Adding a tuning capacitor would aggravate the situation still further. If tuning is not achieved, the coupling between the receiving antenna and the transmitting antenna cannot be optimum and the transmission efficiency is not good. Nor can reducing the surface area of the receiving antenna in order to attempt to achieve tuning be envisaged, since this would impair the quality of the coupling.

There is a risk that the receiving antenna described in French patent publication FR-A1-2 771 965 might, because of its location, not be coupled correctly to the transmitting antenna external to the tire. This is because, with respect to the outside of the tire, it is situated under the carcass reinforcement, which is electrically conductive and will then have the role of a Faraday cage.

The present invention aims to mitigate the drawbacks mentioned above and in particular aims to improve the tuning between a receiving antenna with which a tire is provided and a transmitting antenna situated outside the tire, for example on a vehicle equipped with a tire, without having to reduce the surface area of the receiving antenna connected to the electronic device or having to reduce the working frequency.

More precisely, the present invention proposes a tire equipped with at least one receiving antenna of a receiving device which includes an electronic device intended to be remote controlled by electromagnetic coupling with at least one transmitting antenna. This receiving antenna is intended to be connected to the electronic device and is divided into several loop parts arranged in a parallel circuit, these loop parts each having a surface, these surfaces being juxtaposed overall so that the loop parts can be coupled successively and continuously to the transmitting antenna.

In the context of the present invention, the term "tire" applies not only to the casing inflated at a certain nominal pressure for its normal operation, but also a non-pneumatic elastic casing. "Tire" therefore designates in general terms any product equipped with a tread which runs on the roadway.

The receiving antenna has a useful surface for reception with the transmitting antenna and the sum of the surfaces of all the loop parts is substantially equal to the useful surface of the receiving antenna. With such a structure, the surface of the receiving antenna can advantageously be much larger than that of the transmitting antenna.

To provide good coupling with the transmitting antenna, it is preferable, the loop parts being formed by a conductor, for a portion of a conductor of a first loop part and a portion of a conductor of a second loop part, adjacent to the first loop part, to be separated by a space which is as small as possible.

In the same way, it is preferable for the loop parts to be separated, on the electronic device side, by a space which is as small as possible.

To facilitate tuning between the transmitting antenna and the receiving antenna, a tuning capacitor can be connected in parallel with at least one of the loop parts. The antenna is advantageously shielded in order to reduce its electrical radiation, in particular close to the electronic device and/or the electronic circuit.

The receiving antenna can be immobilized between two sheets of an electrically insulating material in order to form a complex which is installed in the tire.

The tire can comprise, in a crown area, at least one crown reinforcement surrounded by a tread, the complex being inserted between the crown reinforcement and the tread.

It is preferable to produce the sheets of the complex from a material having mechanical properties close to those of the tread so that the insertion of the receiving antenna interferes with the behavior of the tire to the minimum extent.

In another embodiment, the tire comprising a carcass reinforcement covered towards the outside with an external sidewall, the complex can be inserted between the carcass reinforcement and the external sidewall.

The sheets of the complex can be produced from an elastomer with silica and carbon black fillers, this material having a low carbon black content so as to leave it electrically insulating.

It is advantageous, particularly from the point of view of cost and adhesion to the rubber compound, to produce the loop parts with a bare metallic conductor. This conductor can comprise one or more wires.

It is possible to produce the conductor with one or more wires which are of the same nature as the reinforcement wires conventionally employed in the tire. These may be steel wires brass-coated on the surface, or any other wire or cable treated or coated in an appropriate fashion for bonding directly to the rubber.

It is preferable for the conductor to be undulated with a wave pitch adapted to the deformations existing at the point chosen for the installation of the antenna, so as not to interfere with the mechanics of the tire during running.

The conductor can be glued to at least one of the sheets of the complex in order to guarantee good strength of the complex over time.

The tire can be equipped with the electronic device. The electronic device can cooperate with an electronic circuit with which the tire is also equipped.

The electronic circuit can comprise a single rectifying circuit, the loop parts having at least one end connected to the input of the rectifying circuit, the electronic device being connected to the output of the rectifying circuit.

In a variant, the electronic circuit can comprise several rectifying circuits, each loop part having at least one end connected to the input of one of the rectifying circuits, the rectifying circuits having their outputs connected in series with the electronic device.

The electronic device and/or the electronic circuit can be located in a crown area of the tire.

In another embodiment, the electronic device and/or the electronic circuit can be located in a sidewall of the tire.

In yet another embodiment, the electronic device and/or the electronic circuit can be located in an internal volume defined by the tire.

The electronic device and/or the electronic circuit can be located in the complex.

The electronic device can be a sensor, a counter or an electronic label.

The electronic device and/or the electronic circuit can advantageously be shielded in terms of electrical field.

The present invention also concerns a method of producing a tire comprising the following steps:

preparing a carcass, preparing a complex comprising a receiving antenna divided into several loop parts arranged in a parallel circuit, the receiving antenna being secured between two sheets of an electrically insulating material, preferably made from non-vulcanized elastomer material, compatible with the normal materials of the tire, providing a connection with at least one electronic device intended to be remote controlled by electromagnetic coupling between the receiving antenna and at least one transmitting antenna, installing the complex on the tire, covering the complex with an elastomer with a filler and finishing so as to obtain an uncured tire, molding and vulcanizing the uncured tire.

The elastomer with filler forms a tread of the tire or contributes to forming a sidewall of the tire depending on whether the antenna is situated in the sidewall or in the crown.

The method can comprise a step of replacing at least one crown reinforcement on the carcass before positioning the complex.

The method can also comprise a step of forming in the carcass a hole opening out in an internal volume delimited by the tire, this hole being intended to contain connection conductors for the connection between the receiving antenna and the electronic device, the electronic device being situated in the internal volume. This step is followed by a step of replugging the drilled hole containing the conductors through the inside of the tire before curing.

The step of preparing the complex can include the production of at least one extension or flap in which connection conductors are immobilized for the connection between the receiving antenna and the electronic device, this extension being folded over a sidewall of the tire when the complex is placed on a crown area of the tire or on the crown area when the complex is placed on the sidewall.

BRIEF DESCRIPTION OF THE DRAWINGS

The present invention will be understood better from a reading of the description of example embodiments given purely as an indication and in no way limiting, making reference to the accompanying drawings, on which:

FIGS. 3A, 3B, 3C show two examples of a receiving antenna located in the crown area of a tire according to the invention, the latter being connected to an electronic device by a connection which runs in the sidewall of the tire;

In these figures, the identical elements are designated by the same reference characters and the figures are not drawn to scale.

DETAILED DESCRIPTION

Figure 1A:
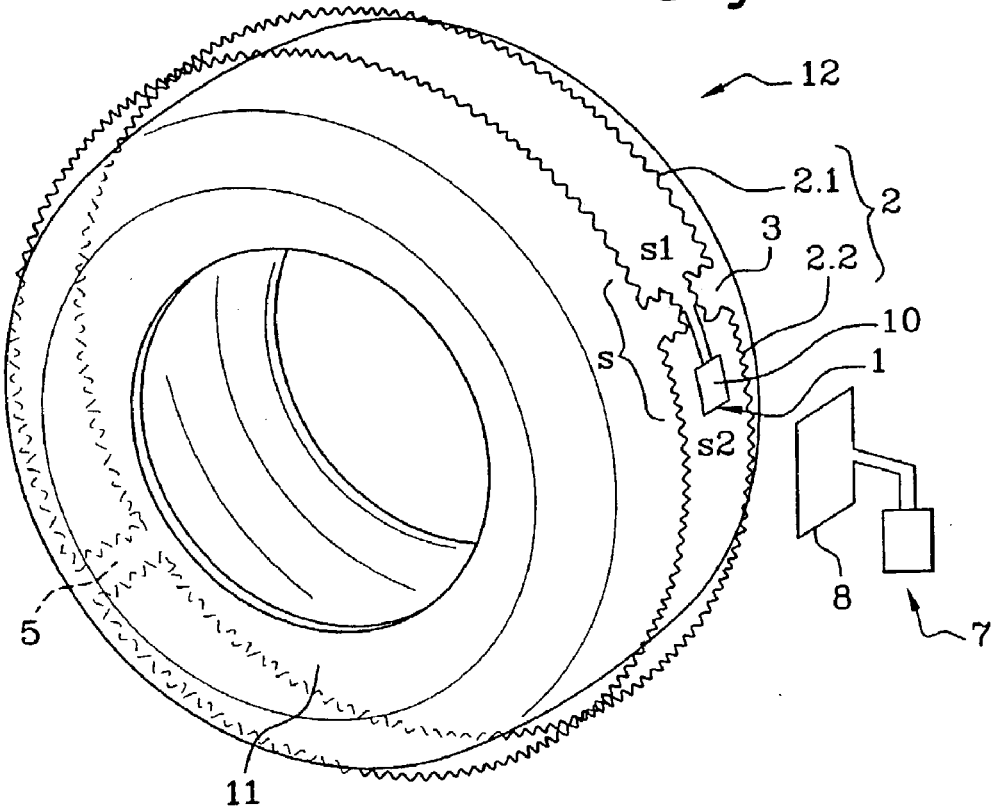
FIGS. 1A, 1B, 1C show an example of a receiving antenna located in the crown area of a tire according to the invention, the electronic device to which it is connected being situated in the non-wearing part of the tread.

Reference will now be made to FIG. 1A in connection with FIGS. 1B, 1C. There can be seen a schematic form of a tire 12 equipped with a reception device 1 comprising at least one electronic device 10, for example a force sensor, intended to be remote-controlled from a transmitting device 7 external to the tire 12.

Remote control means either a supply of energy at a distance from the electronic device, or a communication at a distance between the electronic device and the transmitting device, or both functions.

The electronic device 10 is connected to at least one receiving inductive antenna 2 intended to be coupled electromagnetically to at least one other transmitting inductive antenna 8 of the transmitting device 7. The electronic device 10 could comprise a sensor other than a force sensor, and could be a temperature sensor, a pressure sensor, etc. It can be envisaged for the electronic device to comprise, instead of a sensor, a counter, an electronic label for identifying the tire, a control device for example or a combination of several aforementioned elements.

Figure 1B:
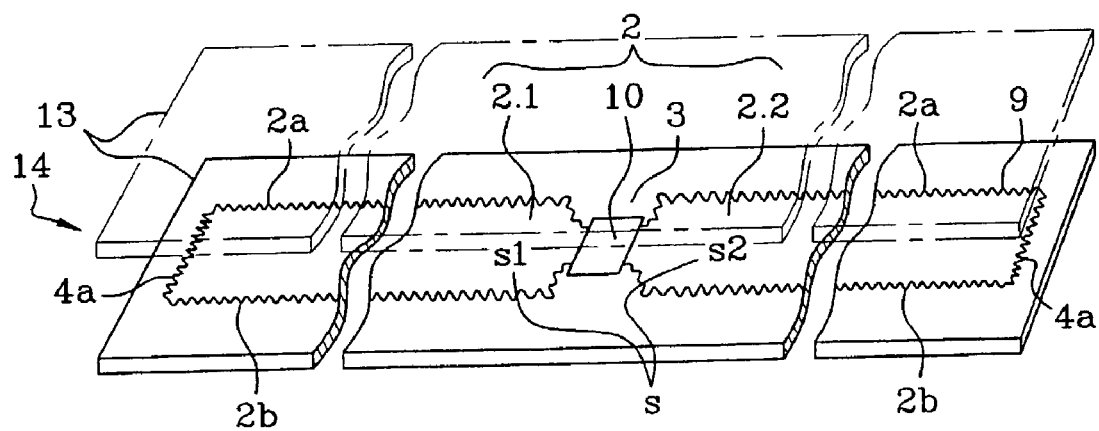
Figure 1C:
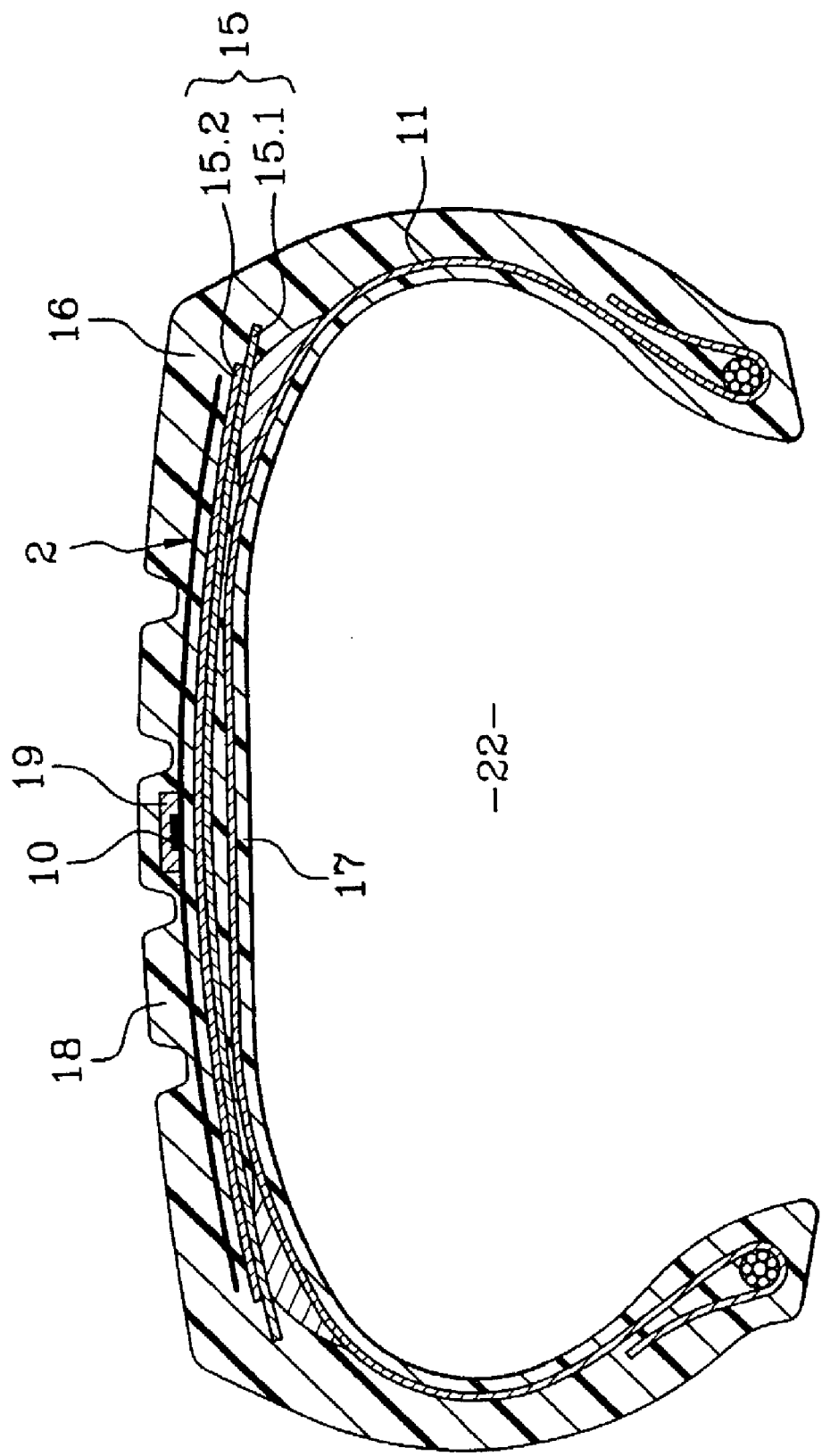

The receiving antenna 2 connected to the electronic device 10 is situated at the crown of the tire 12 under the tread 16, as illustrated by the section in FIG. 1C. The receiving antenna 2 is able to move with the bending and deflections of the tire. The receiving antenna 2 is formed by several loop parts 2.1, 2.2. The various loop parts 2.1, 2.2 are arranged in a parallel circuit. In all the figures, the loop parts comprise a conductor 9 arranged in a single turn, and of course, the loop parts could have several turns.

Each of the loop parts 2.1, 2.2 has a surface which corresponds to the surface of a turn and these surfaces referenced s1, s2 are roughly juxtaposed. This means that, more or less, they are side by side rather than facing each other.

The loop parts 2.1, 2.2 are then coupled successively and continuously to the transmitting antenna 8.

The receiving antenna 2 has a useful surface s for reception with the transmitting antenna 8 of the transmitting device 7 which is substantially equal to the sum of the surfaces s1, s2 of the various loop parts 2.1, 2.2. Useful surface means the maximum surface which effectively serves for transmission and for which the line losses are acceptable.

Figure 9A:
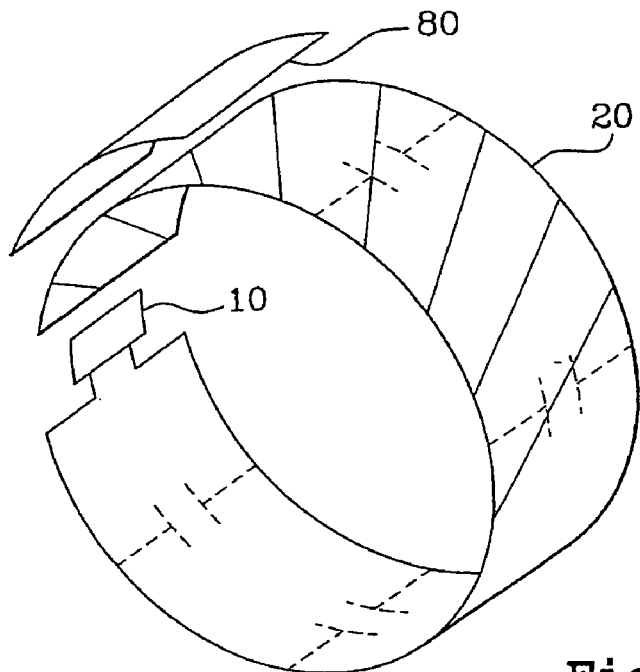
FIGS. 9A, 9B show an example of a receiving antenna of the prior art in two different positions.
Figure 9B:
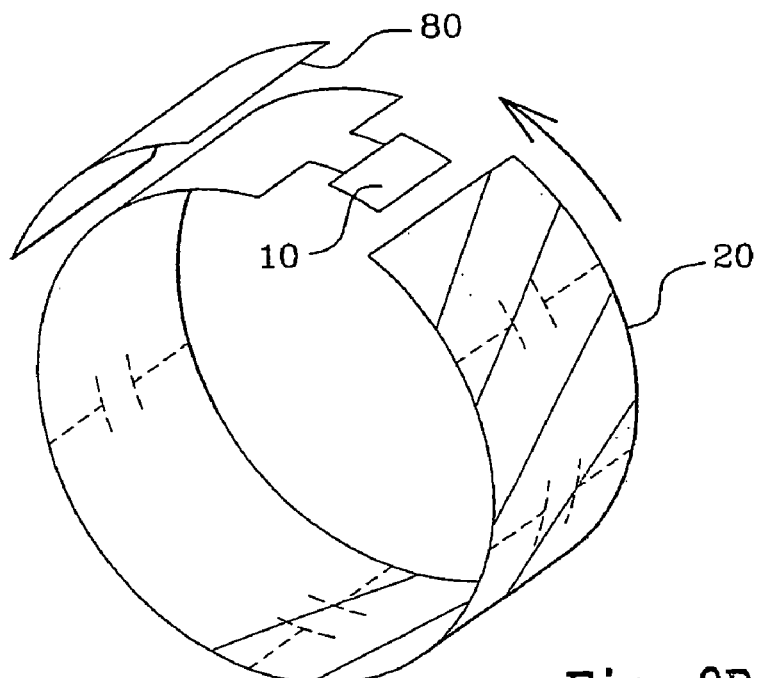

When the receiving antenna is not divided, as is the case in the conventional art, its surface is not completely useful. Reference can be made to FIGS. 9A, 9B. There can be seen therein a conventional receiving antenna 20 for tires and a rectangular transmitting antenna 80. The receiving antenna 20, of large size, is substantially rectangular when it is unwrapped from the tire and laid flat. These antennae must be coupled with each other during the rotation of the tire. The receiving antenna 20 is connected to an electronic device 10. When the two antennae 20, 80 are coupled, an electric current flows in the receiving antenna 20. However, when the transmitting antenna 80 is far from the connection between the receiving antenna 20 and the electronic device 10 (FIG. 9A), because of the inevitable line losses due in particular to stray capacitances practically no signal arrives at the electronic device and the coupling is not satisfactory. On the other hand, when the transmitting antenna 80 is situated close to the connection between the receiving antenna 20 and the electronic device 10 (FIG. 9B), the signal arrives correctly at the electronic device 10 practically without losses. The receiving antenna 20 has a non-useful area which is represented by hatching, and its useful surface is smaller than its actual surface. In the invention, by dividing the receiving antenna, this non-useful area is eliminated.

Reference is once again made to FIG. 1A. The transmitting device 7 is external to the tire 12 and is situated for example on the vehicle on which the tire 12 is mounted. The transmitting device 7 can include the vehicle battery for the power supply and be provided with a transmitting antenna 8. The transmitting antenna 8 can be situated in the wing of the vehicle in order to be facing the receiving antenna 2.

FIG. 1B partially shows the receiving antenna 2 of a tire according to the invention, unwound and laid flat. It comprises two loop parts 2.1, 2.2. Each of these loop parts 2.1, 2.2 has two large substantially parallel portions 2a, 2b which follow the periphery of the crown of the tire 12. These large portions 2a, 2b are disposed so that their relative spacing interferes with the running mechanics of the tire as little as possible once the latter been finalized and vulcanized. The two large portions 2a, 2b of the same loop part are joined, at one end, by a small portion 4a which is shown directed substantially across the width of the tire. The angle formed between the small portion 4a and the large portions 2a, 2b is substantially a right angle. Naturally this angle could perfectly well be any angle and the small portion could have an orientation other than across the width of the tire.

At the other end, the large portions 2a, 2b of the loop parts 2.1, 2.2 are positioned close together in order to form the parallel circuit. The loop parts 2.1, 2.2 thus arranged are connected to the electronic device 10.

A space 3 which is as small as possible separates, on the electronic device 10 side, the two loop parts 2.1, 2.2. This space 3 is preferably less than approximately 1 centimeter.

The lengths of the large portions 2a, 2b of the loop parts 2.1, 2.2 are chosen so that, during the positioning of the receiving antenna 2 around the crown area of the carcass 11, the small portions 4a of each of the loop parts are close to each other without contact with each other. A space 5 of less than approximately one centimeter separates them. In the example described with two substantially identical loop parts 2.1, 2.2, the small portion 4a of the loop parts is approximately 10 to 10.5 centimeters, that is, a little less than the width of the tire, while the large portions 2a, 2b are approximately 1 meter, that is, approximately half the length of the tread.

When the tire is running, a total and continuous inductive coupling can be established between the receiving antenna 2 and the transmitting antenna 8, between the loop parts 2.1, 2.2 and the transmitting antenna 8. The surface s of the receiving antenna 2 is substantially a lateral surface of a cylinder of revolution and corresponds substantially to the surface of the tire tread.

The various loop parts 2.1, 2.2 have been shown as identical but this is not obligatory; they could have different shapes and/or sizes.

By dividing the receiving antenna 2 into several loop parts 2.1, 2.2, arranged in a parallel circuit and juxtaposing their surfaces, the antenna's surface area is practically unchanged and its useful surface is increased compared with that of a single part conventional antenna (such as the one shown in French patent application FR-A1-2 771 965, which occupies substantially the entire surface of the tread). On the other hand, the intrinsic capacitance of the receiving antenna 2 seen by the electronic device 10 and the value of its inductance are reduced.

When the various loop parts 2.1, 2.2 have the same length, the intrinsic capacitance of the receiving antenna 2 is substantially equal to that of one of the loop parts, that is, with respect to a single antenna of the art like the one described in French patent application FR-A1-2 771 965, its intrinsic capacitance is divided by the number of loop parts.

By reducing the intrinsic capacitance of the receiving antenna 2, through division into parts, the resonant frequency of each of the parts is appreciably higher than that of the single antenna with a surface area equivalent to the surface area of all the parts. It is then possible to work at a higher working frequency than before.

Tuning is then achieved either directly by choosing the number of loop parts and/or by choosing the geometry of the loop parts, or by virtue of the association of at least one tuning capacitor connected in parallel with one of the loop parts. No tuning capacitor is illustrated in FIGS. 1A through 1C, but reference can be made to FIG. 8.

Conversely, using a divided antenna can make it possible to increase the surface area by using several loop parts whose surface areas are of the same order of magnitude as that of the conventional single antenna.

The transmitting antenna 8 of the transmitting device 7 has a smaller surface area than the receiving antenna 2. In this application, it could have dimensions of approximately 10 centimeters by 20 centimeters and the working frequency v could be substantially equal to 13.56 MHz.

The receiving antenna 2 is secured between two sheets 13 made from electrically insulating material compatible with the normal tire materials such as a non-vulcanized elastomer containing silica and little carbon black. The thickness of the sheets 13 can, for example, be between approximately 0.1 and 1 millimeter.

The assembly of the two sheets 13 and receiving antenna 2 forms an uncured semifinished complex 14. When the tire is manufactured, crown reinforcements 15, the complex 14, and finally a tread 16 are, in this order, wrapped on the crown of the carcass 111 (preferably after shaping if this is a process comprising a shaping step). At this stage the tire is uncured. Next, conventionally, it is molded and vulcanized in a curing press.

Reference can be made to FIG. 1C, which shows a radial section of a tire according to the invention. The tire defines an internal volume 22 intended to be filled with air. Under the carcass 11 there is an internal sealing layer 17. The crown reinforcements 15, which serve to reinforce the tire, can include, in a conventional manner, two or more superimposed crossed plies 15.1, 15.2 and possibly a cap ply 15.3. The cap ply 15.3 is visible in FIG. 2B. These crown reinforcements 15 generally comprise metallic reinforcement wires, in particular for the crossed plies, and/or textile reinforcement cords, in particular for the hoop ply. The reinforcement wires or cords are embedded in an elastomer with a filler.

The electronic device 10 to which the receiving antenna 2 is connected can be located inside the complex 14, as in FIG. 1B. It is possible, alternatively, for the electronic device 10 to be located outside the complex 14, as in FIG. 1C. In the latter configuration, one of the sheets 13 of the complex 14 is provided with an opening for allowing the conductors 21 for connecting the receiving antenna 2 to the electronic device 10 to pass.

In FIG. 1C, the electronic device 10 is situated in a non-wearing area of the tread 16 so as to guarantee its functioning throughout the life of the tire. The tread 16 has a part intended to be worn with tread pattern elements 18 and the non-wearing area is situated between the crown reinforcements 15 and the part intended to be worn. The tread pattern elements 18 are assumed to be continuous in the circumferential direction of the tread 16. They can of course take a wide variety of shapes and sizes depending on the type of tire and its dimensions.

In this structure with the complex 14 acting as a sublayer with respect to the tread 16, it is advantageous to produce the sheets 13 of the complex 14 from a material having mechanical properties close to those of the material of the tread 16.

During the step of molding the tire at the very start of the vulcanization, the elastomer with filler, forming the tread 16, is liable to undergo fluid displacements under the combined action of the pressure and increase in temperature. To prevent the electronic device 10, situated outside the complex 14, from being displaced with respect to its initial position in the uncured tire, it is possible to provide, in the tread 16, a premolded insert 19 which is at least partially vulcanized. The insert 19 in which the electronic device 10 is placed is filled with an elastomer with filler, preferably of the same composition as that of the tread 16.

In particular when the electronic device 10 is a force sensor intended to measure forces or stresses undergone by the elastomer with filler, in which it is inserted, it is important to promote good cohesion between the electronic device and the elastomer which surrounds it. It is possible to provide an external surface treatment of the electronic device with an adhesive such as, for example, Chemosyl or any other suitable product.

The positioning of the receiving antenna 2 at the crown of the tire makes it possible to effect a remote control of the electronic device continuously while the tire rolls. This position is justified when many signals pass between the receiving device and the transmitting device. This is in particular the case when the electronic device is a force sensor intended to monitor the adhesion or grip of the tire to the ground.

Other positions can be envisaged both for the receiving antenna and for the electronic device, as will be seen below.

The complex 14 including the two electrically insulating sheets 13 makes it possible to produce the loop parts 2.1, 2.2 with a bare metallic conductor 9, that is, one which is not covered with electrical insulation. The cost thereof is reduced compared with the use of insulated conductors. In addition, adhesion to the sheets 13 is much better. The conductor 9 can comprise one or more wires such as the reinforcement wires normally used for producing the carcass or crown reinforcements of the tire. Advantageously, these wires can be made from steel coated with brass on the surface so as to combine both strength and adhesion with the material of the sheets 13 by virtue of the presence of the brass.

Alternatively, the conductor 9 can be glued to the sheets 13 by a gluing method known in the field of tires. A good adhesion of the tires to the sheets makes it possible to obtain good service over time from the tire according to the invention.

When the conductor 9 comprises several wires, the latter can form a cord such as the one used conventionally in tires, and this configuration offers a good possibility of deformation during running. Such a cord is depicted in FIG. 4C.

The conductor 9 can be undulated, that is, laid in a wave pattern, when it is positioned in the tire, this making it possible to interfere to the minimum extent with the mechanics of the tire, and the pitch of the undulations can be adjusted according to the range of the tire and the levels of forces and/or deformations to which it will have to be subjected during its functioning.

Figure 2A:
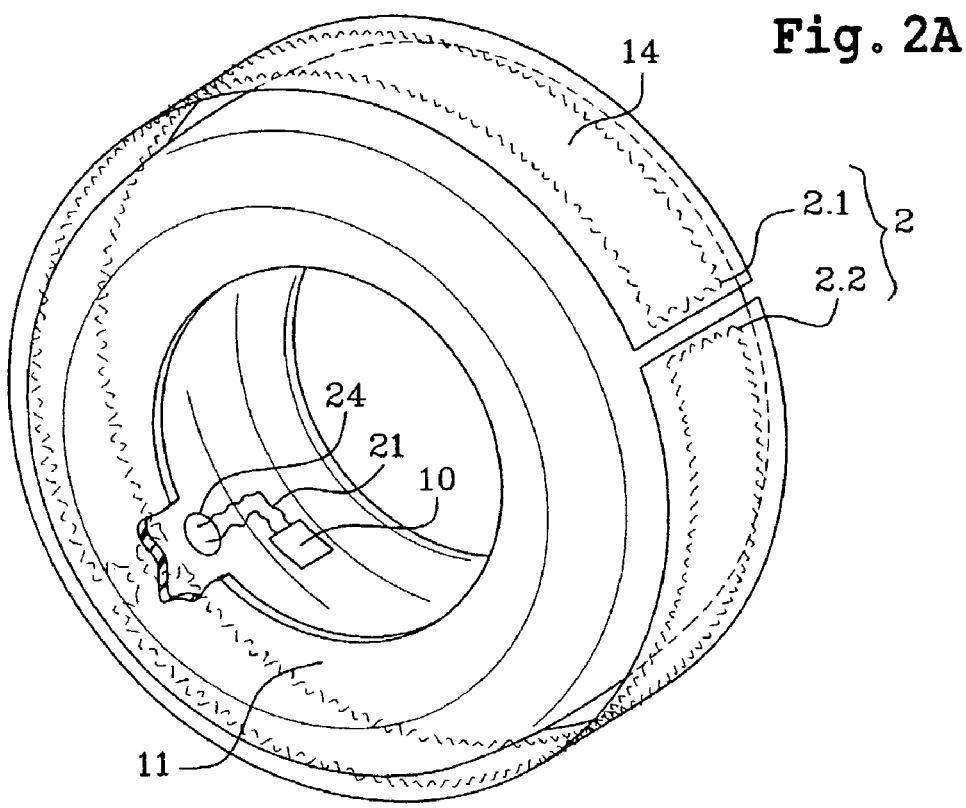
FIGS. 2A, 2B show an example of a receiving antenna located in the crown area of a tire according to the invention, the electronic device to which it is connected being situated in the internal volume defined by the tire.
Figure 2B:
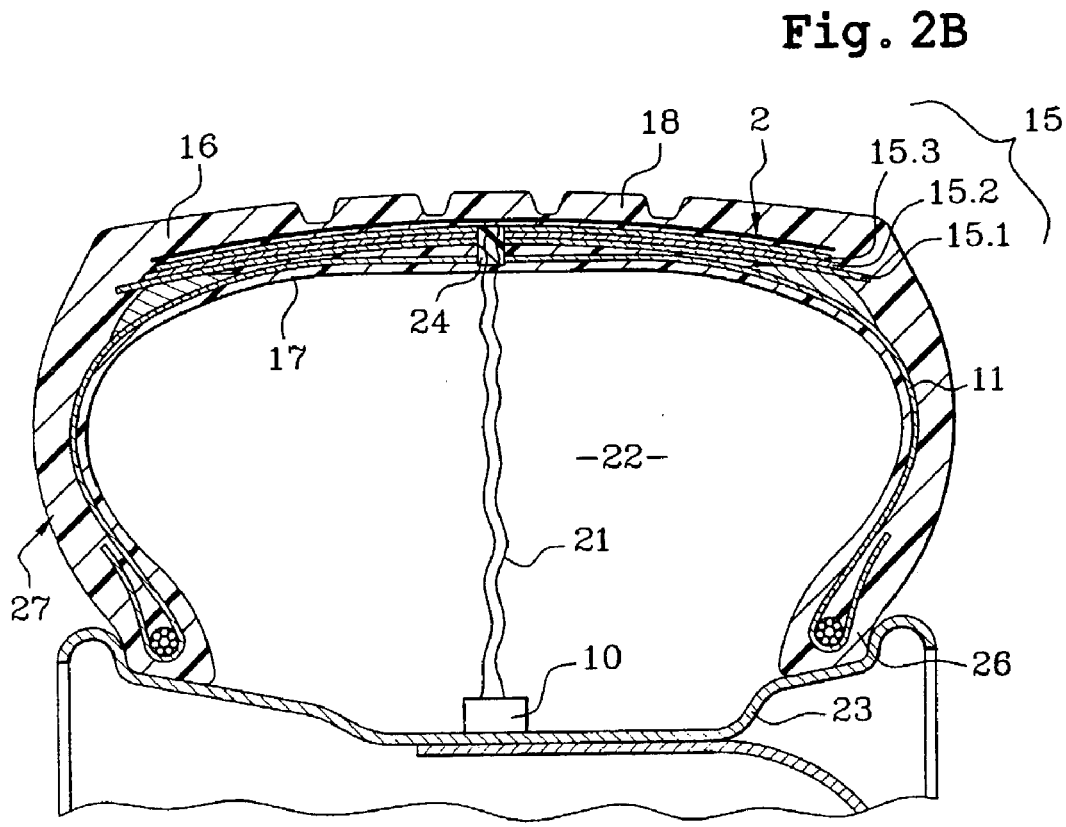

It is possible to locate the electronic device 10 in the internal volume 22 defined by the tire and intended to be filled with air. In this configuration the electronic device 10 can, for example, be a force or temperature sensor, possibly associated with an electronic label. Reference should be made to FIGS. 2A and 2B, which show respectively a view of the carcass 11 supporting a receiving antenna 2 of a tire according to the invention and a radial section through the tire mounted on a rim 23.

The receiving antenna 2, formed by several loop parts 2.1, 2.2 in a parallel circuit, is located as in the embodiment in FIG. 1. However, it is now connected to the electronic device 10 by connection conductors 21 which emerge from the complex 14 towards the inside of the tire, opposite to the tread 16. The connection conductors 21 pass through the crown reinforcements 15, the carcass 111 and the internal sealing layer 17 before projecting into the internal volume 22. The electronic device 10 can be affixed to the internal surface of the tire (as in FIG. 2A) or to the rim 23 (as in FIG. 2B). The rim 23 bears on a bead 26 which encircles the tire at the bottom part of the sidewall 27.

When such a tire is manufactured, a hole 24 is formed, by drilling or other method, through the crown reinforcements 15, the carcass 11 and the sealing layer 17 superimposed on one another, before the complex 14 is positioned. The connection wires 21, individually covered with electrically insulating material, such as an elastomer, are inserted in the hole 24 when the complex 14 is fitted on the crown reinforcements 15. The hole 24 is then replugged from the inside with an elastomer, for example of the same nature as the internal sealing layer 17. Curing of the tire in a mold can then take place.

Figure 3A:
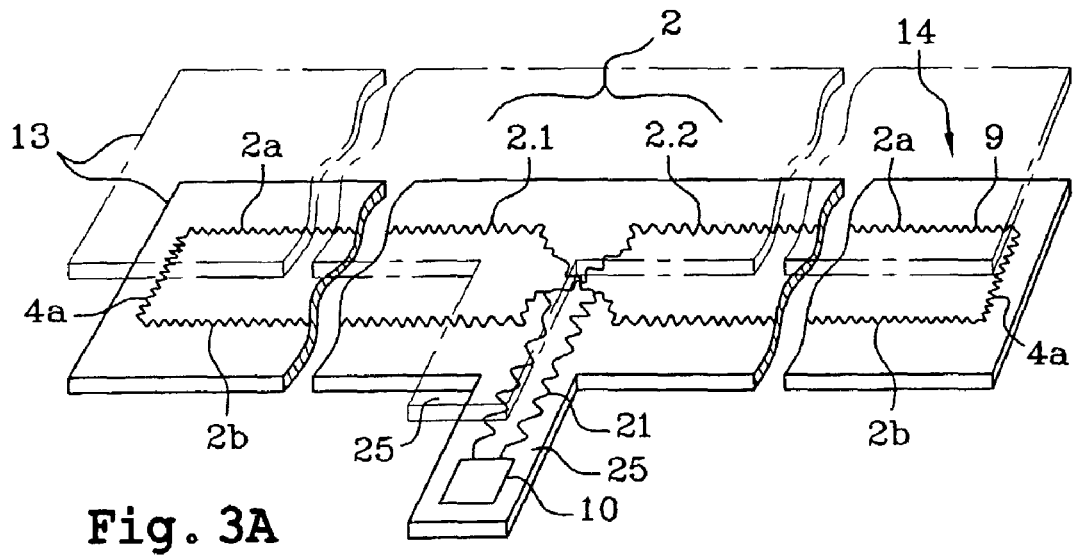
Figure 3B:
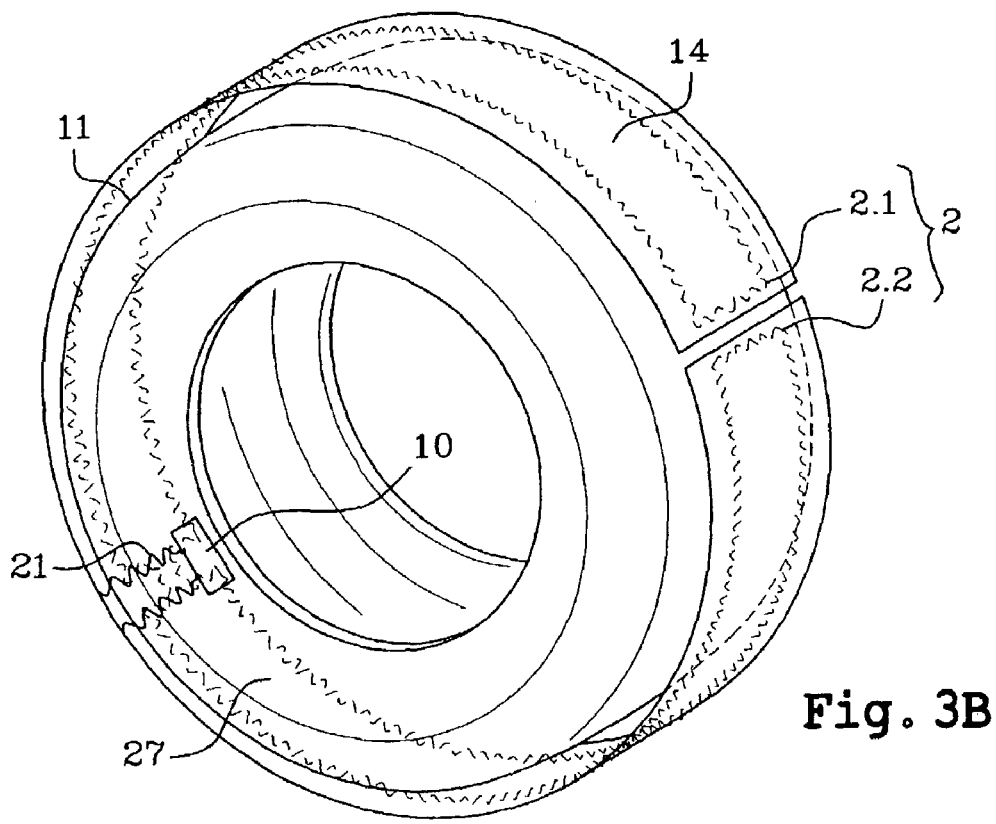

The electronic device 10 may be located in the sidewall 27 of the tire. This location is illustrated in FIGS. 3A through 3C. It is particularly adapted to the measurement of quantities in the tire in real time. The receiving antenna 2 and the receiving antenna 2S are similar to those illustrated in FIGS. 1 and 2. In FIG. 3A, the receiving antenna 2 (or 2S) is shown unwrapped from the tire and flattened in a sandwich between the two sheets 13 of the complex 14.

The connection conductors 21 intended to connect the receiving antenna 2 to the electronic device 10 will run in the sidewall 27 of the tire. The complex 14 comprises an extension 25 and the connection conductors 21 are situated in the complex 14 at the extension 25. When the complex 14 is positioned on the carcass 11, the extension 25 is folded over the part of the carcass corresponding to the sidewall 27 of the tire.

In FIG. 3B, only the complex 14 including the receiving antenna can be seen; it surrounds the carcass 11, before the tread is positioned. Once the tread is positioned, the band of rubber compound constituting the wall of the tire, that is to say the one situated between the carcass 11 and the outside of the tire, which was, at this stage of the production of the tire, turned up on the bottom area, is folded over the carcass 11, covering in particular the extension 25 of the complex 14.

The electronic device 10 can be located in any area of the sidewall 27, either in the central part of the sidewall 27, as in FIG. 3C, or closer to the tread 16, that is to say in the shoulder, or in the bottom area of the tire, as in FIG. 3B, close to the bead 26 on which the rim (not shown) bears.

While the tire is manufactured, when it is still uncured, some of the elastomer with filler producing the external sidewall 27.1 is turned up in order to position the electronic device 10 and to connect it to the receiving antenna 2. The turned up part is then folded down over the electronic device 10 before curing in the mold.

A particular arrangement of the antenna is described above; the latter is such that the conductor 9 is disposed radially externally relative to the crown reinforcement of the tire. In a variant, the antenna is such that the conductor 9 is disposed between the inner liner and the carcass reinforcement of the said tire, or between the crown reinforcement and the carcass reinforcement of the said tire.

It should be added that it is advantageous, from a mechanical point of view, to dispose the conductor 9 in places on the tire with less mechanical stress, even if this does not necessarily correspond to the optimum from an electrical or electromagnetic point of view. This is what is referred to more specifically by the illustration in FIG. 3C. Thus, in the case of a location in the area of the tread, if L designates the axial width of the belt reinforcement, the variant of the receiving antenna 2S illustrated in FIG. 3C comprises a conductor disposed in one or more loops and having lengths extending substantially circumferentially.

The lengths extending substantially circumferentially are disposed axially solely in one or the other of the two areas lying between the limits defined axially at a distance from L/6 from one axial end of the crown reinforcement and at a distance of L/3 from the same axial end of the crown reinforcement. Thus it can be seen in FIG. 3C that the antenna 2S has an "axially outward" conductor position in the left-hand defined area. The connection conductors 21 join the part of the receiving antenna 2S situated to the left of the Figure. It can also be seen in FIG. 3C that the antenna 2S according to this variant comprises a "return" conductor positioned in the right-hand defined area. It should be indicated that the conductors connecting the left-hand part to the right-hand part are preferably disposed parallel to the axis of rotation of the tire in order to be subjected only to negligible stresses when the tread is flattened when passing through the area of contact with the ground at each revolution of the tire. On the other hand, in FIGS. 3A and 3B, although the general appearance of the antenna is very similar, the absence of any information on the axial positioning of the antenna conductor means that it may be any positioning.

Instead of being located under the tread, the receiving antenna 2 can be located in the sidewall 27 of the tire. This variant is illustrated in FIGS. 4A through 4E. It should be noted that this location in a sidewall can also be useful with an antenna forming a single loop, in two C-shaped elements nested and connected to each other.

Figure 4A:
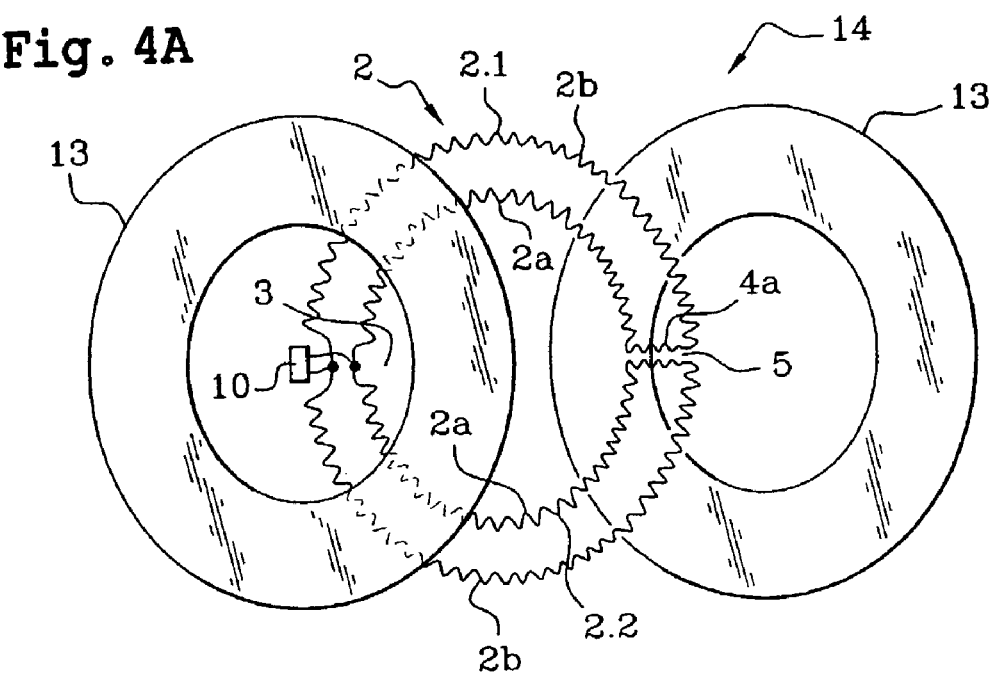
FIGS. 4A, 4B, 4C, 4D, 4E show an example of a receiving antenna located in the sidewall of a tire according to the invention, the electronic device to which it is connected being either in the sidewall of the tire or in the crown area.

In FIG. 4A, the complex 14 can be seen, which comprises the receiving antenna 2 sandwiched between two electrically insulating sheets 13 in the form of a ring. The receiving antenna 2 is formed by several loop parts 2.1, 2.2 arranged in a parallel circuit. In this example, two loop parts 2.1, 2.2 with a semicircular shape have been shown.

The two sheets 13 can be similar to those described in FIG. 1A from the point of view of thickness and composition.

The loop parts comprise two large portions 2a, 2b arranged substantially in a portion of a circle and follow the internal and external edges of the sidewall 27. The spacing between the large portions 2a, 2b of one and the same loop part is substantially constant. The large portions 2a, 2b are disposed so that their relative interspacing interferes with the running mechanics of the tire as little as possible once the tire is finalized and vulcanized. The two large portions 2a, 2b of one and the same loop part are joined, at one end, by a small portion 4a which is shown directed substantially along a radius of the tire. The angle formed between the small portion 4a and the large portions 2a, 2b is substantially a right angle. Naturally this angle could perfectly well be any angle and the small portions could have an orientation other than radial with respect to the tire.

At the other end, the respective large portions 2a, 2b of the loop parts 2.1, 2.2 approach one another in order to form the parallel circuit. The loop parts 2.1, 2.2 thus arranged are connected to the electronic device 10.

A space 3 which is as small as possible separates, on the electronic device 10 side, the two loop parts 2.1, 2.2. This space 3 is preferably less than approximately 1 centimeter.

The lengths of the large portions 2a, 2b of the loop parts 2.1, 2.2 are chosen so that, when the receiving antenna is positioned in the sidewall 27, between the carcass 11 and the external sidewall 27.1 of the tire, the small portions 4a of each of the loop parts are close to each other, while being without contact with each other. A space 5 of less than approximately one centimeter separates them. The small portion 4a could measure approximately 2 to 4 centimeters and the large portions 2a, 2b about one meter. The space 5 between the small portions 4a of the two loop parts could be between 0.1 and 0.5 centimeters, for example.

During the manufacture of the tire, when it is still uncured, the elastomer with filler producing the external sidewall 27.1 is placed on the carcass 11 without being adhered thereto. It is turned up over the bottom area of the tire in order to expose a space for the complex 14 on the carcass 11 at the area corresponding to the sidewall 27.1 of the tire, and then folded over.

The electronic device 10 can be placed in the complex 14 between the two sheets 13 as in FIG. 4A or be located outside the complex 14. In the latter configuration, one of the sheets 13 of the complex has an opening 20 in order to let pass the conductors 21 for connecting the receiving antenna 2 to the electronic device 10. In FIGS. 4B to 4E, the electronic device 10 is located outside the complex.

Figure 4B:
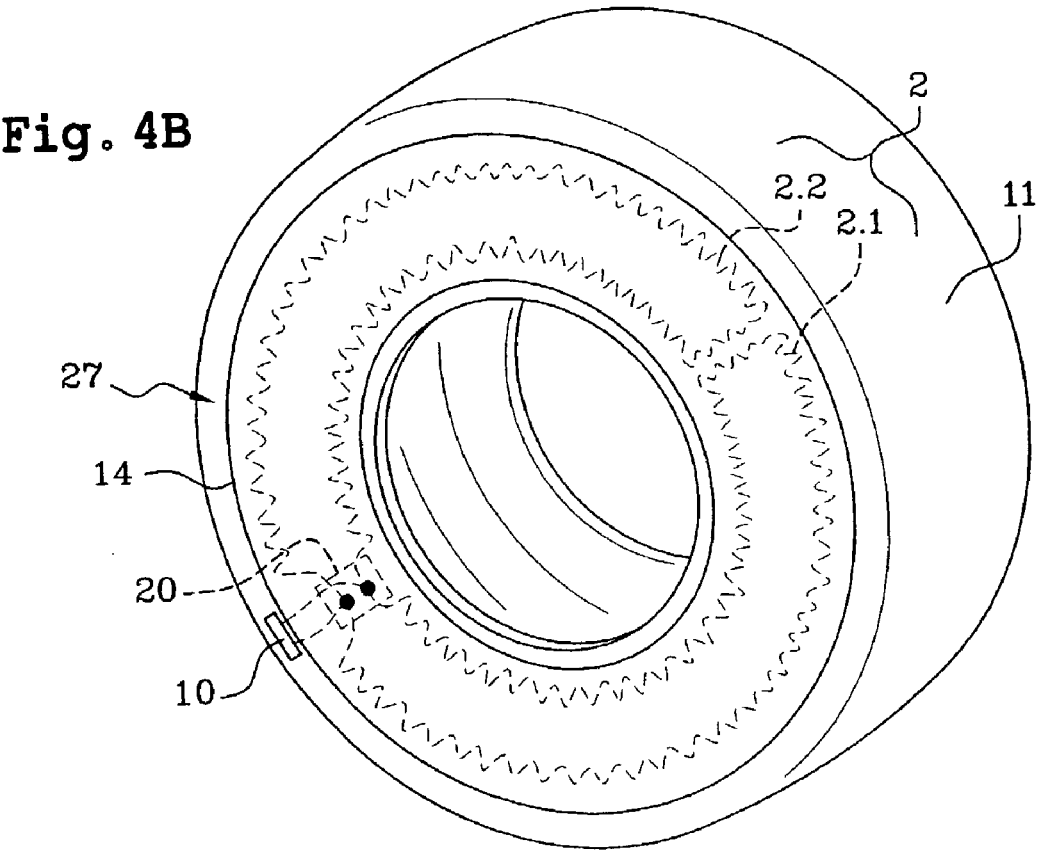
Figure 4C:
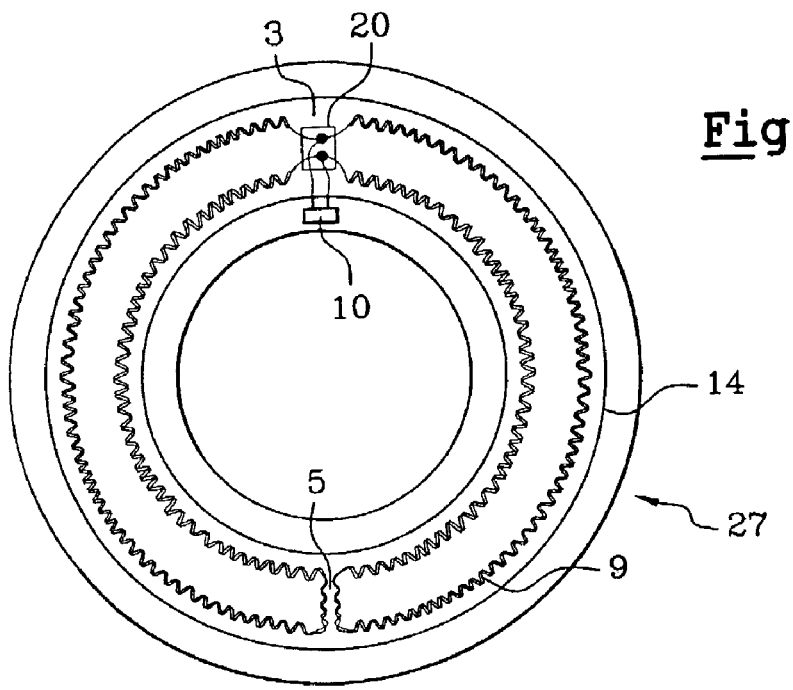

In FIG. 4B, the electronic device 10 is located in the sidewall 27 and more particularly in the shoulder of the tire. In FIG. 4C, the electronic device 10 is in the sidewall 27, but in the bead area of the tire. In this figure, the sheet 13 situated towards the outside of the tire has been removed in order to reveal the conductor 9, which in this drawing takes the form of a cord.

Figure 4D:
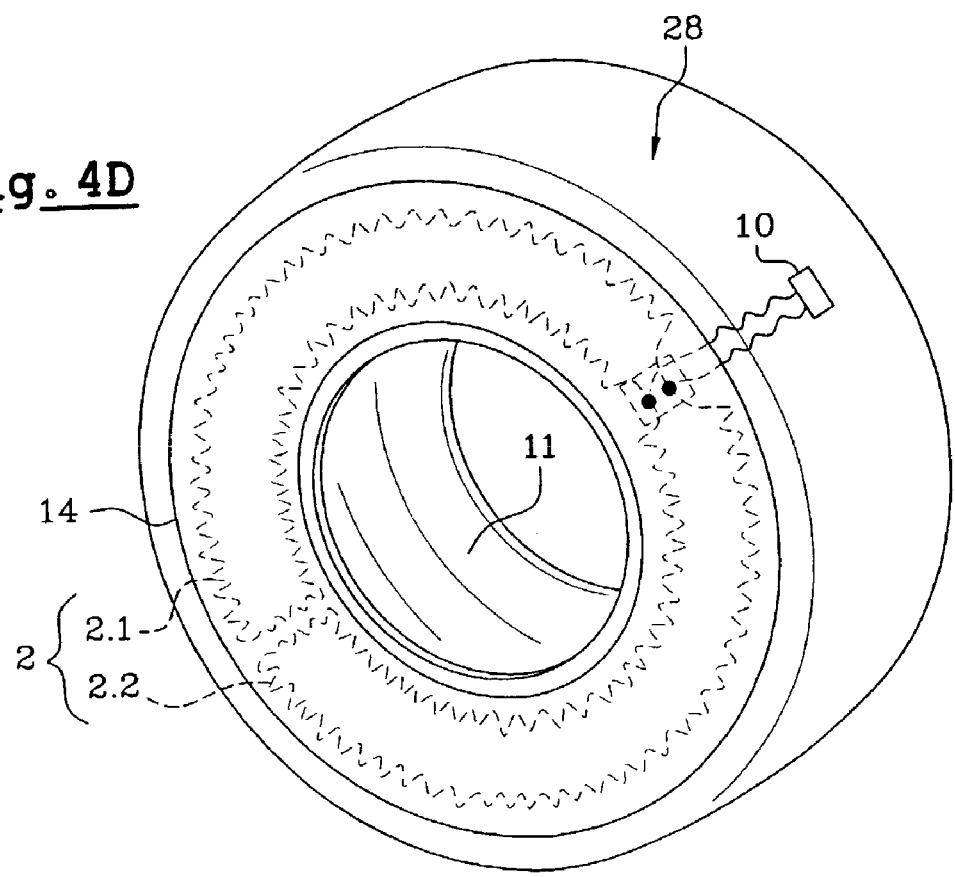
Figure 4E:
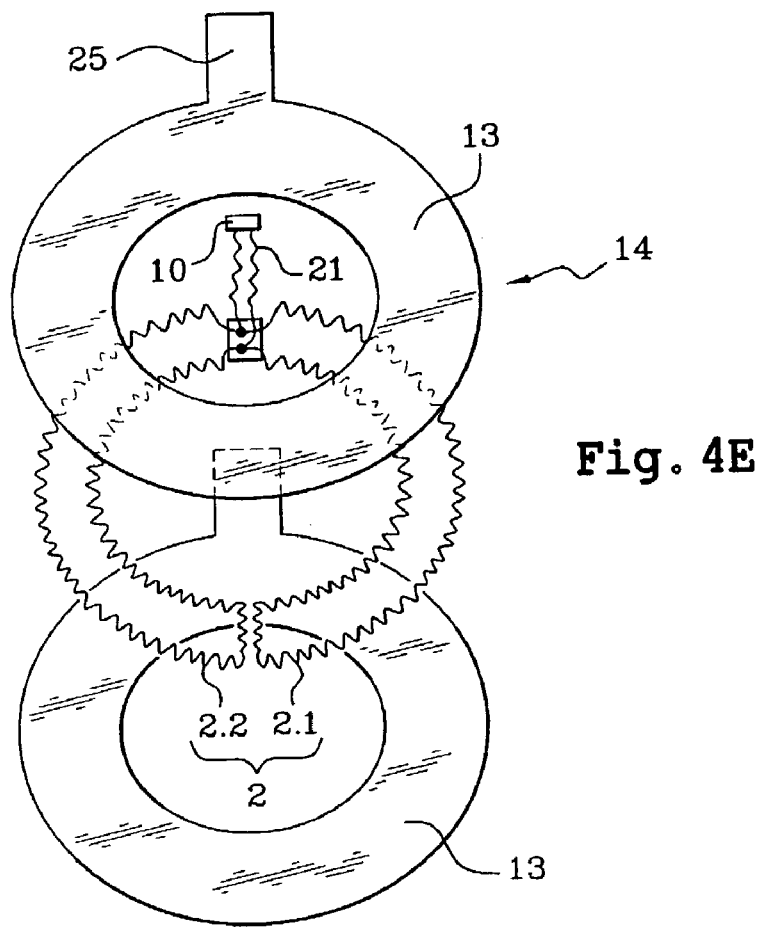

In FIG. 4D, the electronic device 10 is located in the crown area 28 of the tire under the tread (not shown). The complex 14 suitable for this embodiment is depicted in exploded view in FIG. 4E. The complex 14 comprises, in a similar manner to FIG. 3A, an extension 25 or flap in which there are situated the conductors 21 for connecting the receiving antenna 2 to the electronic device 10.

When the complex 14 is placed on the carcass at an area corresponding to the sidewall of the tire, the extension 25 is folded over the crown reinforcements which surround the carcass 11 at the crown of the tire. The tread can then be attached and the external sidewalls folded over.

Figure 5:
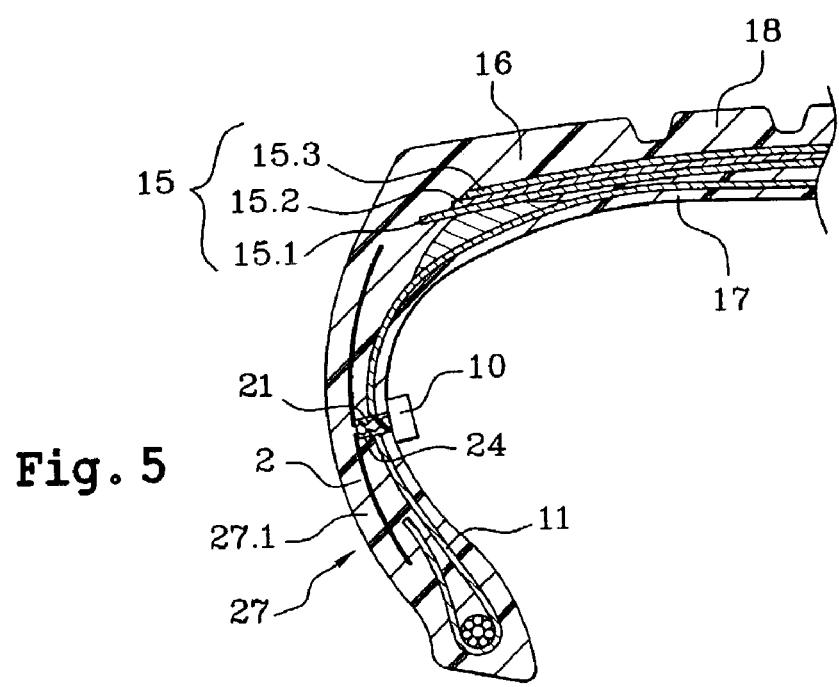
FIG. 5 shows yet another example of a receiving antenna located in the sidewall of a tire according to the invention, the electronic device to which it is connected being in the volume full of air defined by the tire.

FIG. 5 shows yet another variant of the location of the electronic device 10, the receiving antenna 2 also located in the sidewall 27 of the tire in this embodiment. In this variant the electronic device 10 is situated in the internal volume 22 defined by the tire. It is fixed to the internal surface of the tire. It could alternatively be fixed to the rim as in FIG. 2B. As in FIGS. 2A, 2B, a hole 24 has been drilled through the superimposed carcass 11 and sealing layer 17, before positioning the complex 14. The connection conductors 21, individually covered with electrically insulating material, such as an elastomer, are inserted in the hole 24 when the complex 14 is put in place on the carcass 11. The hole 24 is then replugged from inside with an elastomer containing no or only a small quantity of conductive fillers, for example of the same nature as the internal sealing layer 17. The molding and curing of the tire can be carried out.

Figure 6A:
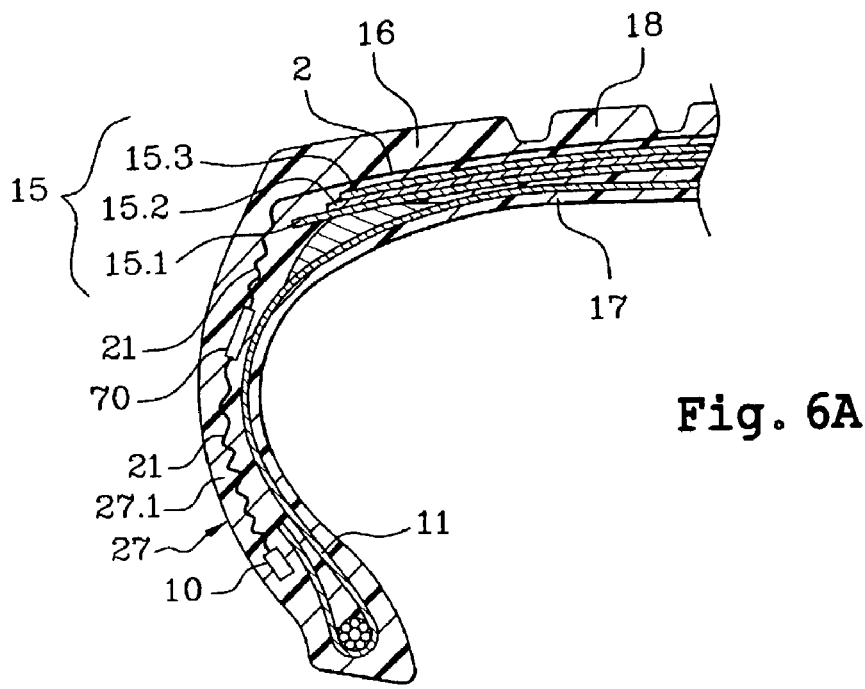
FIGS. 6A, 6B show an example of a receiving antenna located in a tire according to the invention, this antenna being connected to the electronic device by means of an electronic circuit not fixed to the electronic device.
Figure 6B:
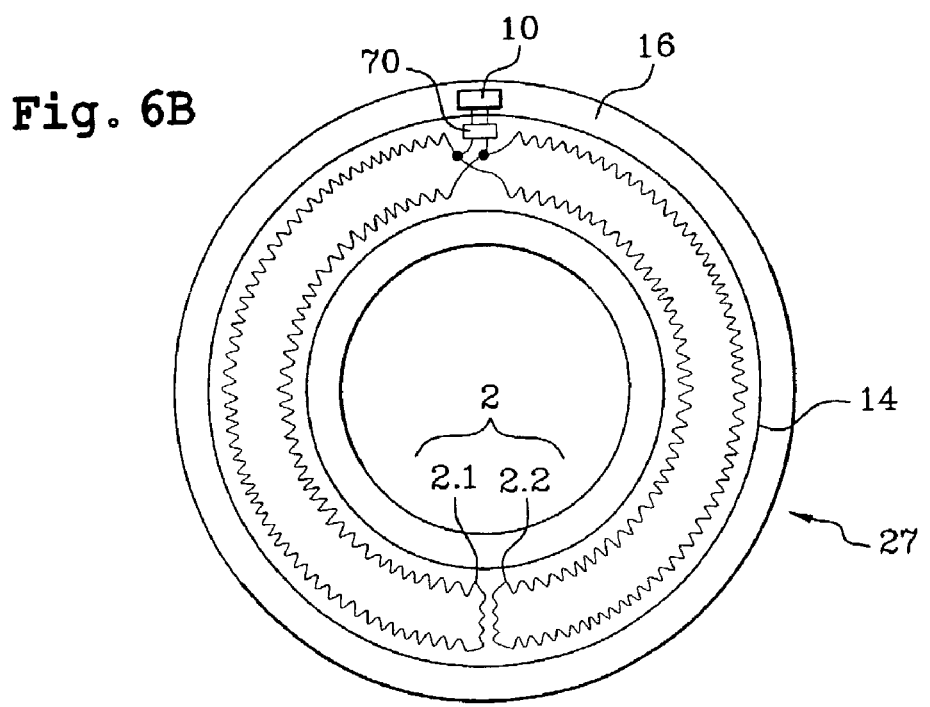

At least one electronic circuit 70 can cooperate with the electronic device 10. It may have an amplification or shaping function, for example. This electronic circuit may not be fixed to the sensor and be connected between the receiving antenna 2 and the electronic device 10. All or part of the electronic circuit can be located in the tire. FIG. 6A shows a partial transverse section of a tire according to the invention. The latter is provided with a receiving antenna 2 located under the tread 16, an electronic circuit 70 situated in the sidewall 27 of the tire in the central part of the latter and an electronic device 10 also in the sidewall 27 but in its bottom part. In FIG. 6B, the receiving antenna 2 is situated in the sidewall 27 of the tire, the electronic circuit 70 is also in the sidewall 27 close to the connection between the loop parts 2.1, 2.2 of the receiving antenna 2 and the electronic device 10 is situated in the crown area 28 of the tire. The electronic circuit 70 could be placed between the two sheets 13 of the complex. It is also possible to place the electronic circuit 70 in the internal volume 22 defined by the tire.

Figure 7A:
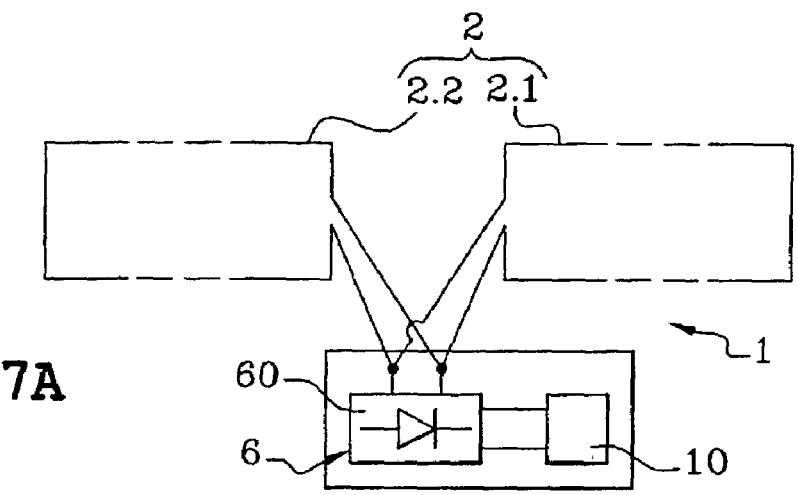
FIGS. 7A, 7B, 7C, 7D show several variants of a connection between the receiving antenna and the electronic device to be remote controlled.
Figure 7B:
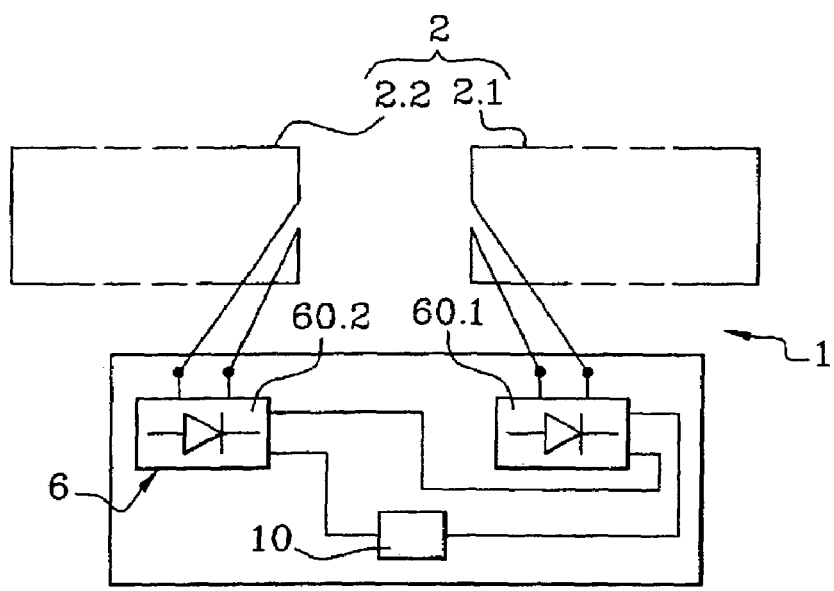

The connection between the ends of the loop parts 2.1, 2.2 of the receiving antenna 2 and the electronic device 10 will now be dealt with reference to FIGS. 7A, 7B. The loop parts 2.1, 2.2 are shown flattened in order to simplify the drawing. The connection is made by means of the electronic circuit 6, which may have a rectifying function.

This electronic circuit 6 can comprise a single rectifying circuit 60 as in FIG. 7A or several 60.1, 60.2 as in FIG. 7B.

In FIG. 7A, all the loop parts 2.1, 2.2 of the receiving antenna 2 are connected in parallel to the input of the rectifying circuit 60, while the electronic device 10 is connected to the output of the rectifying circuit 60 and its input receives from the latter a rectified voltage which depends on the voltages supplied at the input of the shaping circuit by each of the loop parts 2.1, 2.2.

The parallel connection is effected before rectification at the signal induced in the receiving antenna.

In FIG. 7B, each loop part 2.1, 2.2 is connected to the input of a rectifying circuit which is peculiar to it, that is to say respectively 60.1, 60.2, and the outputs of the rectifying circuits cooperate in series with the electronic device 10 so that it receives the sum of the voltages present at the output of the various rectifying circuits 60.1, 60.2. This is because, since the loop parts work successively and continuously, the sum of the signals induced in each of the loop parts is never obtained at the electronic device. At the output of the shaping circuits the signals are continuous and it is possible to add them, but this is not possible before they are converted.

The configuration in FIG. 7A with a single rectifying circuit 60 is more advantageous from the cost and size point of view but also from the point of view of resistance to disturbance. It is better to carry out a single transformation on an added signal rather than several followed by a summation.

Figure 7C:
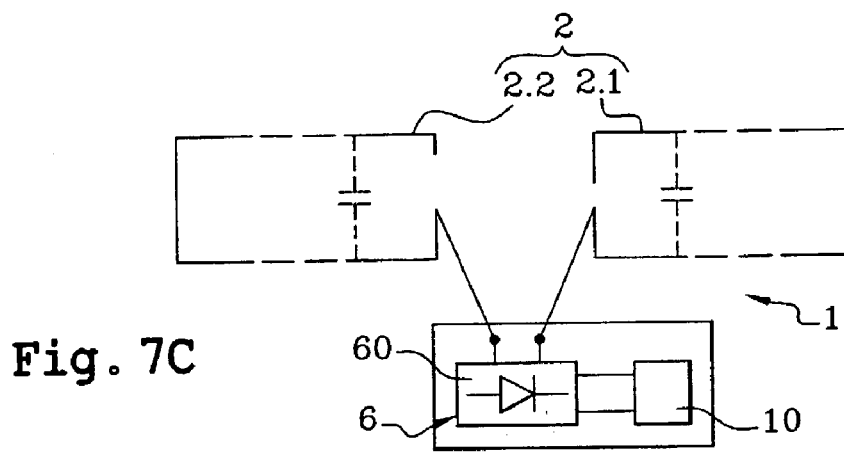
Figure 7D:
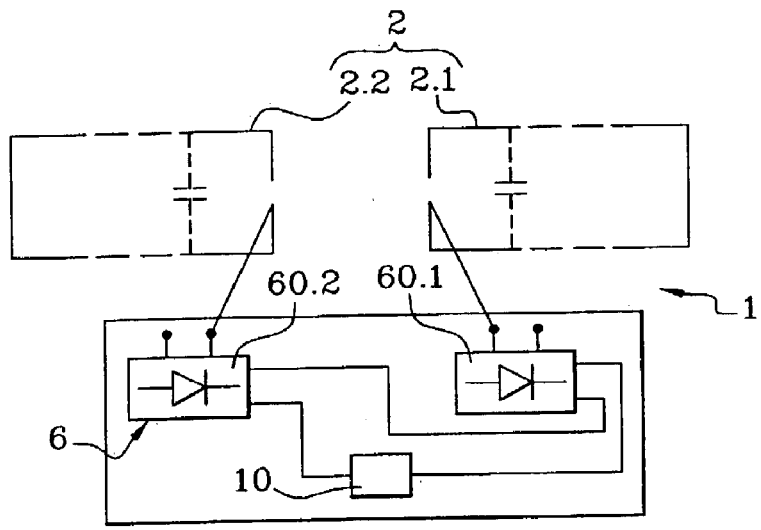

In addition, it should be noted that the loop parts do not need to be closed, that is, the two ends of the loop parts do not need to be electrically connected to the electronic device, a connection with only one of these ends sufficing. The stray capacitances due to the environment provide the looping of the loop part onto the electronic device. FIGS. 7C and 7D illustrate such a configuration. Each of the loop parts 2.1, 2.2 has one end "in the air" and one end connected to the electronic circuit 6. The stray capacitances are shown diagrammatically in dotted lines.

Figure 8:
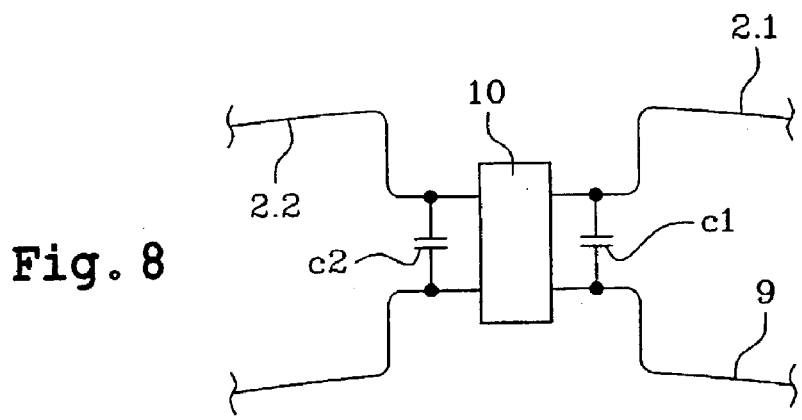
FIG. 8 shows the loop parts of the receiving antenna and tuning capacitors connected to these loop parts.

In FIG. 8, the connections of the loop parts 2.1, 2.2 to the electronic device 10 have been shown in an enlarged fashion, omitting the electronic circuit so as not to overcomplicate the figure. Tuning capacitors c1, c2 have been placed in parallel on each of the loop parts 2.1, 2.2 and are located at the ends which are connected to the electronic device 10.

Although several embodiments of the present invention have been depicted and described in detail, it will be understood that various changes and modifications can be made without departing from the scope of the invention. In particular the present invention is not limited to the forms of receiving antennae presented; several electronic devices can be to one and the same receiving antenna, the latter being remote controlled from the transmitting device by means of the receiving antenna. They can be located at different points, and it can be envisaged that each of the sidewalls be provided with at least one electronic device.

What is claimed is:

1. A tire having at least one receiving antenna for a receiving device including an electronic device for remote control by electromagnetic coupling with at least one external transmitting antenna, the receiving antenna being intended to be connected to the electronic device, wherein the receiving antenna comprises at least two loop parts arranged in a parallel circuit, each loop part having a surface, and the surfaces being juxtaposed so that the loop parts are couplable successively and continuously about the circumference of the tire to an external transmitting antenna.

2. The tire according to claim 1, wherein the receiving antenna has a useful reception surface which is substantially equal to the sum of the surfaces of the loop parts.

3. The tire according to claim 1, wherein the loop parts are each formed by a conductor, a portion of a conductor of an at least first loop part and a portion of a conductor of an at least second loop part adjacent to the at least first loop part being separated by a space.

4. The tire according to claim 1, wherein the at least two loop parts are separated, at the electronic device, by a space.

5. The tire according to claim 1, further comprising a tuning capacitor connected in parallel with at least one of the at least two loop parts to tune the at least one loop part to the transmitting antenna.

6. The tire according to claim 1, wherein the receiving antenna is secured between two sheets formed of an electrically insulating material to form a complex, wherein the complex is located in the tire.

7. The tire according to claim 6, further comprising, in a crown area of the tire, at least one crown reinforcement surrounded by a tread, wherein the complex is inserted between the crown reinforcement and the tread.

8. The tire according to claim 7, wherein the sheets of the complex are produced from a material having mechanical properties compatible with the tread.

9. The tire according to claim 7, wherein the complex is disposed between the crown reinforcement and a carcass reinforcement of the said tire.

10. The tire according to claim 7, wherein the complex is disposed radially externally relative to the crown reinforcement.

11. The tire according to claim 6, wherein the complex is located in the tire crown, and wherein the tire crown has a belt reinforcement extending axially over a distance L, wherein the each at least two loop parts has a length extending substantially circumferentially and is disposed axially in one of two areas lying between limits situated axially at a distance of L/6 from an axial end of the crown reinforcement and at a distance of L/3 from the axial end of the crown reinforcement.

12. The tire according to claim 6, wherein the complex is disposed between an inner liner and a carcass reinforcement of the tire.

13. The tire according to claim 6, further comprising a carcass covered, on an outside of the tire, with an external sidewall, wherein the complex is inserted between the carcass and the external sidewall.

14. The tire according to claim 6, wherein the sheets are produced from an elastomer containing silica and an amount of carbon black sufficiently small to make the elastomer electrically insulating.

15. The tire according to claim 14, wherein the loop parts are formed of a bare metallic conductor.

16. The tire according to claim 15, wherein the conductor comprises one or more cords.

17. The tire according to claim 15, further comprising reinforcement cords, wherein the conductor comprises at least one cord formed of the same material as the reinforcement cords.

18. The tire according to claim 15, wherein the conductor comprises at least one steel wire brass-coated on the surface.

19. The tire according to claim 15, wherein the conductor is undulated.

20. The tire according to claim 15, wherein the conductor is glued to at least one of the sheets of the complex.

21. The tire according to claim 1, further comprising an electronic device connected to the receiving antenna.

22. The tire according to claim 21, further comprising an electronic circuit which cooperates with the electronic device.

23. The tire according to claim 22, wherein the electronic circuit comprises a single rectifying circuit, the loop parts having at least one end connected to an input of the rectifying circuit, the electronic device being connected to an output of the rectifying circuit.

24. The tire according to claim 22, wherein the electronic circuit comprises a plurality of rectifying circuits, each loop part having at least one end connected to an input of a rectifying circuit, the plurality of rectifying circuits having respective outputs connected in series with the electronic device.

25. The tire according to claim 22, wherein the tire has a crown area, and wherein at least one of the electronic device and the electronic circuit is located in the crown area.

26. The tire according to claim 22, wherein the tire has a sidewall, and wherein at least one of the electronic device and the electronic circuit is located in the sidewall.

27. The tire according to claim 22, wherein the tire defines an internal volume, and wherein at least one of the electronic device and the electronic circuit is located in the internal volume.

28. The tire according to claim 22, wherein the receiving antenna is immobilized between two sheets formed of an electrically insulating material to form a complex, wherein the complex is located in the tire, and wherein at least one of the electronic device and the electronic circuit is located in the complex.

29. The tire according to one of claim 21, wherein the electronic device comprises at least one element selected from the group comprising a sensor, a counter and an electronic label.

30. A method of manufacturing a tire with a receiving antenna, comprising the steps of:
preparing a tire carcass,
preparing a complex including a receiving antenna divided into a plurality of loop parts arranged in a parallel circuit, the receiving antenna being secured between two sheets of an electrically insulating material compatible with the normal materials of the tire,
providing a connection for at least one electronic device intended to be remote controlled by electromagnetic coupling between the receiving antenna and at least one transmitting antenna,
installing the complex on the tire carcass,
covering the complex with an elastomer with a filler and finishing to obtain an uncured tire, and,
molding and vulcanizing the uncured tire.

31. A method according to claim 30, wherein the complex is installed on a crown of the tire carcass and the elastomer with filler forms a tread of the tire.

32. A method according to claim 31, wherein the method further comprises the step of placing at least one crown reinforcement on the carcass before installing the complex.

33. A method according to claim 31, wherein the step of preparing the complex includes preparing at least one extension of the complex and further comprising steps of securing connection conductors on the at least one extension for a connection between the receiving antenna and an electronic device, and folding the extension over a sidewall of the tire after the complex is placed on the crown of the tire carcass.

34. A method according to claims 30, wherein the complex is installed on a sidewall of the tire carcass and the elastomer with filler forms a sidewall of the tire.

35. A method according to claim 34, wherein the step of preparing the complex includes the preparing at least one extension of the complex and the method further comprises the steps of securing connection conductors on the at least one extension for a connection between the receiving antenna and an electronic device, and folding the extension over a crown area of the tire after the complex is placed on the sidewall of the tire carcass.

36. A method according to claim 30, wherein the method further comprises the step of drilling in the carcass a hole opening out in the internal volume defined by the tire, and positioning in the hole connection conductors for the connection between the receiving antenna and an electronic device situated in the internal volume.

37. A method according to claim 36, wherein further comprising the step of plugging the drilled hole containing the conductors from the inside of the tire before curing.

38. A method according to claim 30, wherein the sheets are made from non-vulcanized elastomer material.

* * * * *